US011830369B2

(12) United States Patent
Lindqvist et al.

(10) Patent No.: US 11,830,369 B2
(45) Date of Patent: Nov. 28, 2023

(54) METHOD, DEVICE AND SYSTEM FOR PROGRAMMING A UAV TO BE CONTROLLED BASED ON COMMUNICATION VIA AT LEAST TWO MOBILE COMMUNICATION NETWORKS

(71) Applicant: Telefonaktiebolaget LM Ericsson (publ), Stockholm (SE)

(72) Inventors: Morgan Lindqvist, Sundbyberg (SE); Remi Robert, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 312 days.

(21) Appl. No.: 16/959,429

(22) PCT Filed: Jan. 12, 2018

(86) PCT No.: PCT/SE2018/050026
§ 371 (c)(1),
(2) Date: Jun. 30, 2020

(87) PCT Pub. No.: WO2019/139511
PCT Pub. Date: Jul. 18, 2019

(65) Prior Publication Data
US 2020/0372811 A1    Nov. 26, 2020

(51) Int. Cl.
*G08G 5/00* (2006.01)
*B64C 39/02* (2023.01)
*G05D 1/00* (2006.01)
*H04W 36/14* (2009.01)
*H04W 88/06* (2009.01)
*G05D 1/08* (2006.01)

(52) U.S. Cl.
CPC ......... *G08G 5/0034* (2013.01); *B64C 39/024* (2013.01); *G05D 1/0022* (2013.01);
(Continued)

(58) Field of Classification Search
CPC .. G08G 5/0034; G08G 5/0004; G08G 5/0069; B64C 39/024; B64C 2201/141;
(Continued)

(56) References Cited

U.S. PATENT DOCUMENTS 9,927,808 B2 *  3/2018  Wänstedt ............. H04W 36/22
2016/0300492 A1  10/2016  Pasko et al.
(Continued)

OTHER PUBLICATIONS

International Search Report and Written Opinion for International Application No. PCT/SE2018/050026, dated Sep. 10, 2018, 16 pages.
(Continued)

*Primary Examiner* — Isaac G Smith
*Assistant Examiner* — Jennifer M Anda
(74) *Attorney, Agent, or Firm* — Nicholson De Vos Webster & Elliott LLP

(57) ABSTRACT

An unmanned aerial vehicle, UAV is controlled based on communication via at least two mobile communication networks. Before takeoff, the UAV receives position data describing starting and destination points. A flight plan is set up from the starting point to the destination point by obtaining information about service coverage provided by the two mobile communication networks in a volume between the starting and destination points. A path to be followed by the UAV is calculated at least based on the obtained information. The path defines a restriction volume within which the UAV is allowed to fly from the starting point to the destination point. The path is calculated on the further basis of at least one switching criterion for changing from a communicative connection between the UAV and the first mobile communication network to a communicative connection between the UAV and the second mobile communication network.

15 Claims, 4 Drawing Sheets

(52) U.S. Cl.
CPC ......... *G05D 1/0808* (2013.01); *G08G 5/0004* (2013.01); *G08G 5/0069* (2013.01); *H04W 36/14* (2013.01); *B64U 2201/10* (2023.01); *H04W 88/06* (2013.01)

(58) Field of Classification Search
CPC ... G05D 1/0022; G05D 1/0808; H04W 36/14; H04W 36/18; H04W 36/30; H04W 88/06; H04W 36/245; H04W 36/16
See application file for complete search history.

(56) References Cited

U.S. PATENT DOCUMENTS

| | | | |
|---|---|---|---|
| 2016/0300493 A1 | 10/2016 | Ubhi et al. | |
| 2017/0337218 A1 | 11/2017 | Pasko et al. | |
| 2017/0351254 A1 | 12/2017 | Listwin et al. | |
| 2017/0358216 A1 | 12/2017 | Priest | |
| 2018/0026708 A1* | 1/2018 | Priest | G08G 5/0043 370/316 |
| 2018/0247544 A1* | 8/2018 | Mustafic | G08G 5/0034 |
| 2018/0248613 A1* | 8/2018 | Peitzer | H04B 17/12 |
| 2019/0379445 A1* | 12/2019 | De Rosa | G08G 5/0039 |

OTHER PUBLICATIONS

M. Scharf et al., "Multipath TCP (MPTCP) Application Interface Considerations," Mar. 2013, 31 pages, Internet Engineering Task Force (IETF), Request for Comments: 6897, IETF Trust and the persons identified as the document authors.

* cited by examiner

METHOD, DEVICE AND SYSTEM FOR PROGRAMMING A UAV TO BE CONTROLLED BASED ON COMMUNICATION VIA AT LEAST TWO MOBILE COMMUNICATION NETWORKS

CROSS-REFERENCE TO RELATED APPLICATIONS

This application is a National stage of International Application No. PCT/SE2018/050026, filed Jan. 12, 2018, which is hereby incorporated by reference.

TECHNICAL FIELD

Embodiments presented herein relate to methods, devices and systems for programming an unmanned aerial vehicle (UAV) to be controlled based on communication via at least two mobile communication networks.

BACKGROUND

As is apparent from the acronym, a UAV is an aircraft without a human pilot aboard. The flight of such an aircraft must therefore be remotely monitored by a ground station through a command and control (C2) link. Additional commands may also be transmitted to the UAV during the flight through the channel provided by the C2 link. For obvious reasons, this connection is essential to the safety of the operation of an UAV.

Due to the existence of widely deployed infrastructures, mobile network operators (MNOs) are starting to be used as C2 link for operation of UAVs. However, due to coverage limitations, it may sometimes be necessary to switch from one MNO to another during a flight.

US 2016/0300493 describes a device that receives a request for a flight path, for a UAV, from a first location to a second location, and calculates the flight path based on the request for the flight path. The device determines network requirements for the flight path based on the request, and determines scores for multiple networks with coverage areas covering a portion of the flight path. The device selects a particular network, from the multiple networks, based on the network requirements for the flight path and based on the scores for the multiple networks. The device causes a connection with the UAV and the particular network to be established, and generates flight path instructions for the flight path. The device provides, via the connection with the particular network, the flight path instructions to the UAV to permit the UAV to travel from the first location to the second location via the flight path.

US 2016/0300492 and US 2017/0337218 show a device that receives a request for a flight path, for a UAV, from a first location to a second location, and calculates the flight path based on the request. The device determines network requirements for the flight path based on the request, and selects a network based on the network requirements. The device generates flight path instructions, and device provides the flight path instructions to the UAV to permit the UAV to travel from the first location to the second location via the flight path. The device receives, at a particular point of the flight path, an indication that the UAV is leaving a coverage area of the network and entering a coverage area of a third party network, and hands off the UAV to a third party device to permit the third party device to monitor traversal of the flight path by the UAV, via the third party network.

In the known solutions, no mechanism is specified as how to perform the connection switching, for example from one MNO to another. However, as the C2 connection is vital for the proper UAV operation, this might lead to several issues. First, no fallback mechanism is specified in case of a switching error, for instance if the target network/the network to be switched to, is momentarily unavailable. This could lead to the UAV being in a connectionless state without any proper communication channel with the ground station for a period of time. Furthermore, the switching procedure might not be instantaneous.

SUMMARY

Therefore, it is an object of the present disclosure to provide an improved solution for controlling a UAV via at least two mobile communication networks, and further for controlling the switching from one mobile communication network to another during flight.

According to a first aspect there is presented a method implemented in a first network node for programming a UAV to be controlled based on communication via at least two mobile communication networks. The method implemented in the first network node involves: receiving position data that describe starting and destination points respectively; and setting up a flight plan from the starting point to the destination point. The setting up of the flight plan, in turn, comprises: obtaining information about service coverage provided by at least two mobile communication networks in a volume between the starting and destination points; and calculating a path to be followed by the UAV at least based on said obtained information. Further, the method involves: providing the path via a first interface of the first network node, which path defines a restriction volume within in which the UAV is allowed to fly from the starting point to the destination point. If at least first and second mobile communication networks provide service coverage in said volume, the method also involves calculating the path on the further basis of at least one switching criterion for changing from a communicative connection between the UAV and the first mobile communication network to a communicative connection between the UAV and the second mobile communication network.

According to a second aspect there is presented a computer program comprising computer code which, when run on a processing circuitry of a first network node, causes the first network node to be configured to receive, position data that describe starting and destination points respectively; and set up a flight plan from the starting point to the destination point. The setting up of the flight plan, in turn, involves: obtaining information about service coverage provided by at least two mobile communication networks in a volume between the starting and destination points; and calculating a path to be followed by the UAV at least based on said obtained information. Further, the computer program comprising computer code which, when run on the processing circuitry of the first network node, causes the first network node to be configured to provide the path via a first interface of the first network node, which path defines a restriction volume within in which the UAV is allowed to fly from the starting point to the destination point. If at least first and second mobile communication networks provide service coverage in said volume, the computer program comprises code which, when run on the processing circuitry of the first network node, causes the first network node to be further configured to calculate the path on the further basis of at least one switching criterion for changing from a communicative connection between the UAV and the first mobile communication network to a communicative connection between the UAV and the second mobile communication network.

According to a third aspect there is presented a computer program product comprising a computer-readable storage medium storing the above-described computer program.

According to a fourth aspect there is presented a method implemented in a UAV for controlling the UAV based on communication via at least two mobile communication networks, which UAV is configured to be programmed by receiving a path to be followed from a starting point to a destination point, wherein the path has been calculated according to the above-described method, and the method implemented in a UAV involves: receiving a path to be followed by the UAV from the starting point to the destination point; thereafter receiving a start command; in response thereto, flying the UAV from the starting point to the destination point along the path; and while flying along the path, sending, repeatedly, report messages to a second network node, which report messages indicate a connection status between the UAV and one of the at least two mobile communication networks.

According to a fifth aspect there is presented a computer program comprising computer code which, when run on a processing circuitry of a UAV causes the UAV to be configured to: be controlled based on communication via at least two mobile communication networks; be programmed by receiving a path to be followed by the UAV from a starting point to a destination point, wherein the path has been calculated according to the above-described method. Moreover, the computer program comprises computer code which, after that the UAV has received said path causes the UAV to be configured to receive a start command; in response thereto fly the UAV from the starting point to the destination point along the path; and while flying along the path, send, repeatedly, report messages to a second network node, which report messages indicate a connection status between the UAV and one of the at least two mobile communication networks.

According to a sixth aspect there is presented a computer program product comprising a computer-readable storage medium storing the above-described computer program.

According to a seventh aspect there is presented a method implemented in a second network node for controlling a UAV based on communication via at least two mobile communication networks, and which UAV has been programmed according to the above-described method. The method implemented in the second network node involves sending a start command to the UAV, which start command is configured to cause the UAV to initiate a flight from the starting point to the destination point along said path. After having sent the start command, the method implemented in the second network node further involves receiving, repeatedly, report messages from the UAV, which report messages indicate a connection status between the UAV and one of the at least two mobile communication networks.

According to an eighth aspect there is presented a computer program comprising computer code which, when run on a processing circuitry of a second network node for controlling a UAV based on communication via at least two mobile communication networks, which UAV has been programmed according to the above-described method, causes the second network node to be configured to send a start command to the UAV, which start command is configured to cause the UAV to initiate a flight from the starting point to the destination point along said path.

Moreover, the computer program comprises computer code which, when run on the processing circuitry of the second network node, after having sent the start command, causes the second network node to receive, repeatedly, report messages from the UAV, which report messages indicate a connection status between the UAV and one of the at least two mobile communication networks.

According to a ninth aspect there is presented a computer program product comprising a computer-readable storage medium storing the above-described computer program.

According to a tenth aspect there is presented a first network node configured to program a UAV to be controlled based on communication via at least two mobile communication networks.

The network node contains a first interface and processing circuitry. The processing circuitry, in turn, is configured to: receive position data that describe starting and destination points respectively; set up a flight plan from the starting point to the destination point. The setting up of the flight plan involves: obtaining information about service coverage provided by at least two mobile communication networks in a volume between the starting and destination points; calculating a path to be followed by the UAV at least based on said obtained information; and providing the path via the first interface, which path defines a restriction volume within in which the UAV is allowed to fly from the starting point to the destination point. Additionally, the processing circuitry is configured to, if at least first and second mobile communication networks provide service coverage in said volume, calculate the path on the further basis of at least one switching criterion for changing from a communicative connection between the UAV and the first mobile communication network to a communicative connection between the UAV and the second mobile communication network.

According to an eleventh aspect there is presented a UAV containing a communication interface and processing circuitry. The processing circuitry is configured to: enable the UAV to be controlled based on communication via at least two mobile communication networks, be programmed according to the above-described method, receive a path to be followed from a starting point to a destination point; thereafter receive a start command; in response thereto fly from the starting point to the destination point along the path; and while flying along the path, send, repeatedly, report messages to a second network node, which report messages indicate a connection status between the UAV and one of the at least two mobile communication networks.

According to a twelfth aspect there is presented a second network node, which is configured to control a UAV based on communication via at least two mobile communication networks, and which UAV has been programmed according to the above-described method. The second network node contains a second interface and processing circuitry. The processing circuitry is configured to send a start command to the UAV via the second interface, which start command is configured to cause the UAV to fly from the starting point to the destination point along said path. After having sent the start command, the processing circuitry is further configured to receive, repeatedly, report messages from the UAV via the second interface, which report messages indicate a connection status between the UAV and one of the at least two mobile communication networks.

The method embodiments, as well as the devices and systems implementing the methods, advantageously cater for any issue occurring during the mobile connection network switching operation through safety mechanisms included to ensure that the UAV is not left without any functioning C2 Link during switching from a first to a second mobile connection network, and that the user is alerted of the progression and possible issues occurring during the mobile connection network switching operation.

Embodiments presented herein also improves safety during the switching operation, since the flight path P generated by the method/network node constitutes a safe environment for the UAV to stay during an interval when it is connectionless, due of failed connection with all available mobile connection networks. This reduces the risk of an unforeseen or un-monitored issue occurring during the transition/switching.

Another advantage is that embodiments presented herein improve flight planning. The time and criteria for a mobile communication network switching operation are considered already during the flight path planning phase. This allows selection of a flight path taking these criteria into account.

Embodiments presented herein further advantageously speed up the mobile network connection switching operation, by obtaining already in the flight path planning phase both the MNOs and the frequency/communication band(s) to be used for communication during the flight, the need for the UAV to scan across all available bands during flight is removed. This is especially relevant in 5G due to the increased number of bands supported here.

Yet another advantage is that embodiments presented herein leverage on the fact that mobile communication network of different MNOs cover different areas with different qualities. By providing connectivity based on one or more soft or embedded SIM MNO profiles the UAVs can connect to the optimal mobile communication network, based on an evaluation of at least one switching criterion along the flight.

Yet a further advantage is accomplished by embodiments presented herein, wherein the method comprises, and/or the UAV, is configured to pre-program at least one modem so that mobile communication network connectivity is continuous during the flight. Thereby, the safety during the switching operation is further enhanced.

It is to be noted that any feature of the first, second, third, fourth, fifth, sixth, seventh, eighth, ninth, tenth, eleventh and twelfth aspects may be applied to any other aspect, wherever appropriate. Likewise, any advantage of the first aspect may equally apply to the second, third, fourth, fifth, sixth, seventh, eighth, ninth, tenth, eleventh and twelfth aspect respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The proposed concept is now described, by way of example, with reference to the accompanying drawings, in which.

DETAILED DESCRIPTION

The proposed concept will now be described more fully with reference to certain embodiments. This proposed concept may, however, be embodied in many different forms and should not be construed as limited to the embodiments set forth herein; rather, these embodiments are provided by way of example so that this disclosure will be thorough and complete, and will fully convey the scope of the proposed concept to those skilled in the art.

We propose a solution for providing and implementing a UAV flight plan based on radio or other mobile communication network coverage, irrespective of operator, and considering the requirements for safe network switching operations. For each one of these operations, based on the location, the local legislation and the UAV capabilities, embodiments presented herein enable providing the constraints required to ensure safe network switching. In one or more embodiments, based on resolution of these constraints, instructions are generates that are to be followed by the UAV for each switching operation. The constraints required to ensure safe network switching may comprise for example any or all of the switching requirements described herein, i.e. a signal power level, a signal quality level, a throughput measure, and/or a latency value.

In some embodiments the generic terminology "network node", is used. Here, the network node can be any kind of the following nodes: ground station of any kind, for example represented by a radio network node (for example a base station, radio base station, base transceiver station, base station controller, network controller, gNB, en-gNB, nr-eNB, NR BS, evolved Node B (eNB), Node B, Multi-cell/multicast Coordination Entity (MCE), relay node, access point, radio access point, Remote Radio Unit (RRU) Remote Radio Head (RRH), a multi-standard BS (a.k.a. MSR BS), a core network node (for example, MME, SON node, a coordinating node, positioning node (for example location server, SMLC, E-SMLC etc.), MDT node, etc.), or an external node (for example, 3rd party node, a node external to the current network), etc.

As described herein, during the flight, embodiments of the invention enable monitoring of the progression of each flying and/or network switching related operation and can quickly send alerts to a network node if any issue arises.

Figure 5:
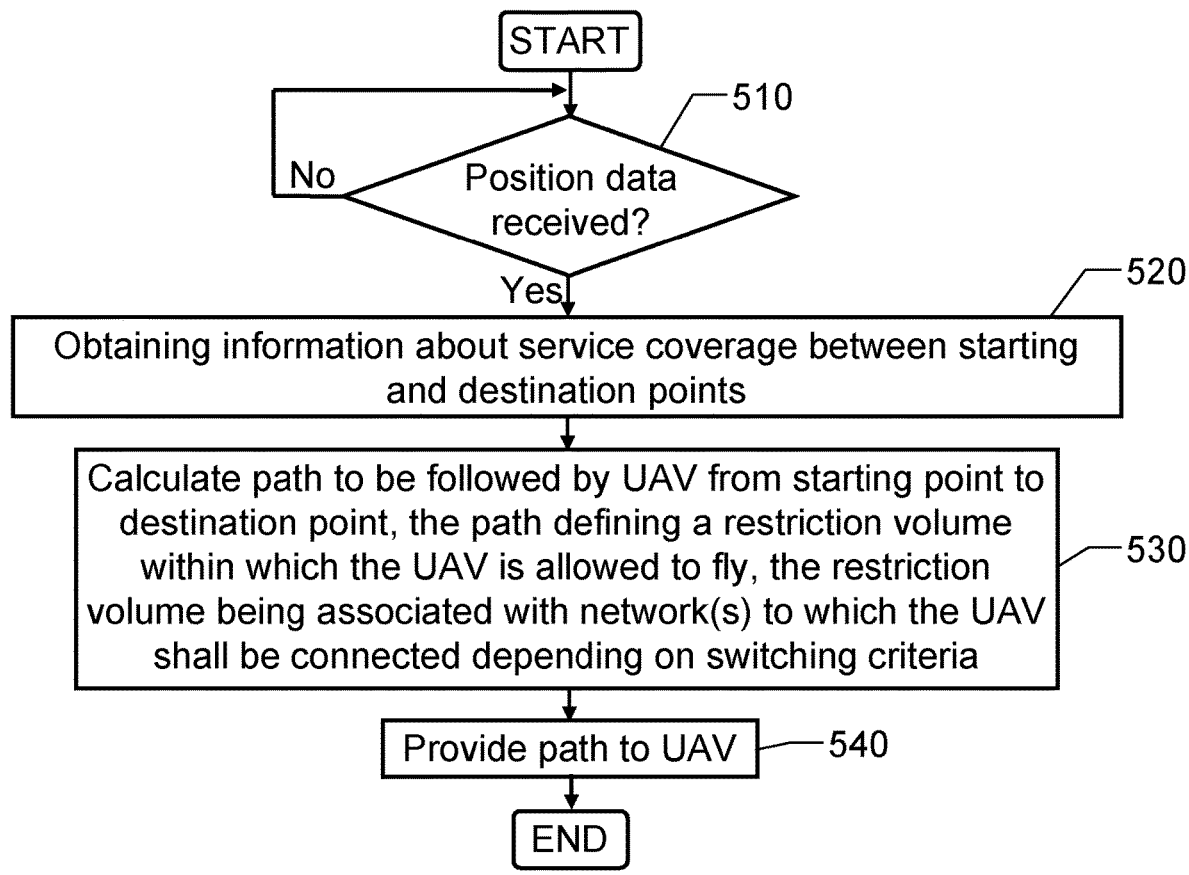
FIG. 5 is a first flow chart illustrating a method performed in the first network node according to one embodiment of the invention.

Referring now to FIG. 5, we will describe embodiments of a method implemented and/or performed in a network node 310 for programming an unmanned aerial vehicle 100, UAV, to be controlled based on communication via at least two mobile communication networks N1, N11, N2 and N3 that are operated by at least two different MNOs.

Step 510: receiving position data DP describing starting and destination points S and D respectively.

If position data DP has been received, the method continues with setting up a flight plan from the starting point S to the destination point D, by:

In Step 520: obtaining information about evaluating service coverage SC provided by at least two mobile communication networks N1, N11, N2 and N3 in a volume between the starting and destination points S and D respectively; and In Step 530: calculating a path P to be followed by the UAV 100 at least based on said obtained information.

According to embodiments wherein at least first and second mobile communication networks N1, N11, N2 and N3 provide service coverage in said volume, the path P is calculated on the further basis of at least one switching criterion SW1-11, SW1-2 and SW2-3 for changing from a communicative connection between the UAV 100 and the first mobile communication network, for example represented by N1, N11 and N2, to a communicative connection between the UAV 100 and the second mobile communication network, for example represented by N11, N2 and N3. In the embodiments shown in FIGS. 1 and 2, the different mobile communication networks, N1, N11, N2 and N3 may be operated by four different MNOs. Alternatively, a first MNO may be responsible for N1 and N3, while a second MNO is responsible for N2 and a third MNO is responsible for N11. In general terms, the proposed solution is applicable wherever there are geographical overlaps between two or more mobile communication networks operated by at least two different MNOs.

Step 540: providing the path P via an interface 315 of the network node 310, which path P defines a restriction volume $VR_1$, $VR_2(t0)$, $VR_2(t1)$ and $VR_2(tn)$ within which the UAV 100 is allowed to fly from the starting point S to the destination point D.

Figure 1:
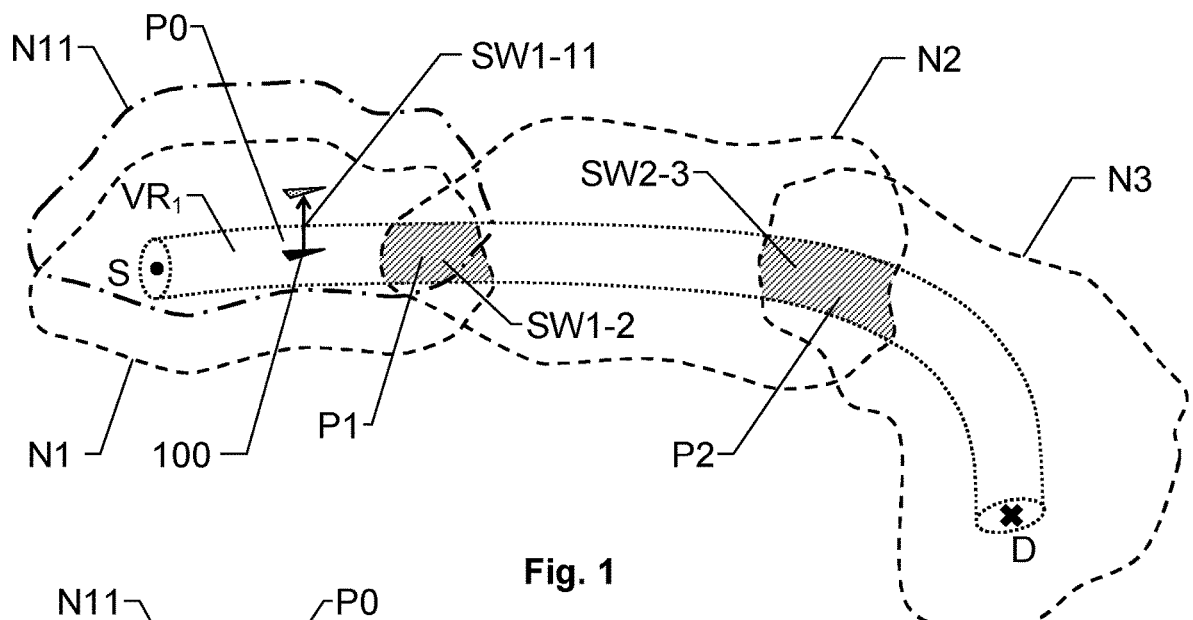
FIG. 1 schematically illustrates how a flight path and an associated restriction volume for a UAV are calculated between a starting point and a destination point according to a first embodiment of the invention.

As illustrated in FIG. 1, the restriction volume may represent a tunnel VR1 extending from the starting point S to the destination point D. Alternatively, as illustrated in FIG. 2, the restriction volume may represent a limited space whose location $VR_2(t0)$, $VR_2(t1)$ and $VR_2(tn)$ between the starting point S and the destination point D varies over time t0, t1 and tn.

In one or more embodiments, the calculating of the path P of Step 530 may further be based on a presupposition that the UAV 100 is capable of implementing two or more Mobile Network Operator (MNO) profiles, sSIM1, sSIM2, sSIMm, in the soft- or embedded SIM, which may be represented by an Embedded Universal Integrated Circuit Card, eUICC, as described in the GSM-Association document "Embedded SIM Remote Provisioning Architecture", Version 1.1, 30 Jan. 2014 and further that the restriction volume VR1, $VR_2(t0)$, $VR_2(t1)$ and $VR_2(tn)$ is associated with a respective mobile communication network to which the UAV 100 shall be connected depending on the at least one switching criterion SW1-11, SW1-2 and SW2-3 while flying along the path P.

In the context of the disclosed embodiments, the at least one switching criterion SW1-11, SW1-2 and SW2-3 may comprise evaluation of at least one of: a signal power level, a signal quality level, a throughput measure, and a latency value.

Figure 2:
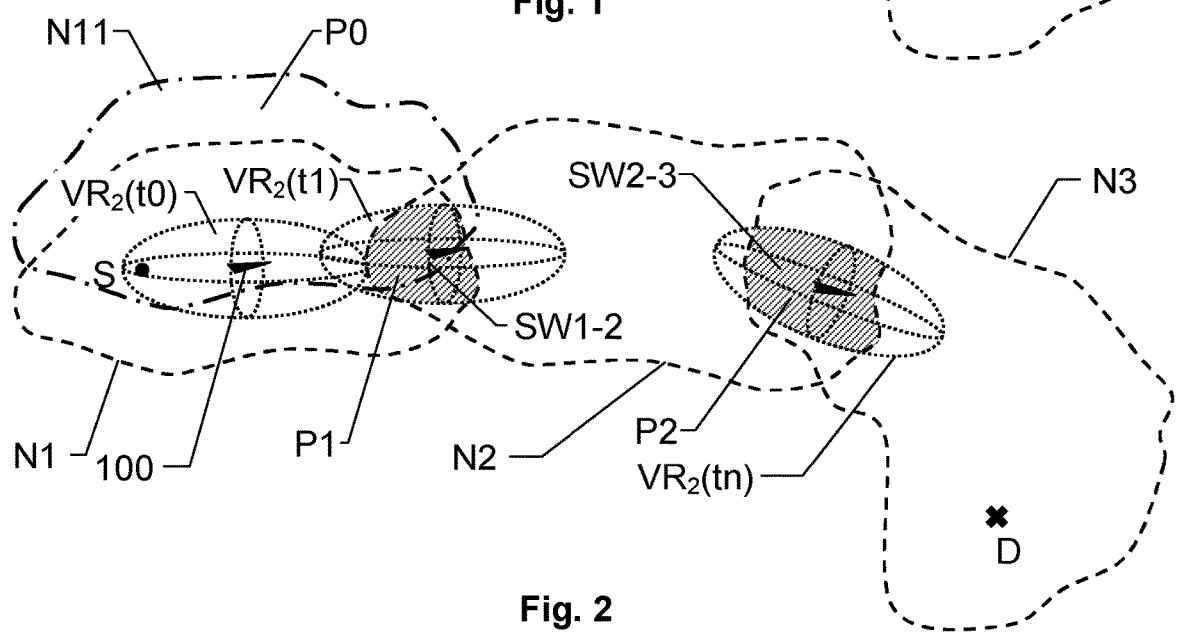
FIG. 2 schematically illustrates how a flight path and an associated restriction volume for a UAV are calculated between a starting point and a destination point according to a second embodiment of the invention.

In the context of the disclosed embodiments, the switching criteria e.g. SW1-11, SW1-2 and SW2-3 illustrated in FIGS. 1 and 2 involve evaluation of one or more factors that influence the UAV's possibilities and/or capacity to communicate with the second network node 410. For example, said evaluation may therefore include comparing a received signal power level in a first communication network, say N1, with a received signal power level in a second communication network, say N2; comparing a received signal quality level in a first communication network, say N2, with a received signal power level in a second communication network, say N3; comparing a throughput measure in a first communication network, say N1, with a throughput measure in a second communication network, say N11; and/or comparing a latency value in a first mobile communication network, say N11, with a latency value in a second mobile communication network, say N1. If, by some standard, the power level, the signal quality level, the throughput measure and/or the latency value is better to a sufficient degree in the communication network to which the UAV is not connected than in the network to which the UAV is connected, a switching criterion is deemed to be fulfilled. As a result, a switching procedure to the other communication network is initiated, i.e. from said first to said second communication network, or vice versa depending on the relative relationships in terms of evaluated factors, such as signal power, signal quality, throughput and latency. Thus, the UAV can be connected to a most appropriate communication network at all times depending on its location and the communication capacity provided at this location by one or more communication networks. Typically, high signal power and high signal quality is preferred over lower ditto. However, under some circumstances, higher signal power and/or signal quality may be traded in favor of better throughput and/or less latency, for example when sending relatively large amounts of data from or to the UAV, e.g. in connection with streaming video from an onboard camera.

In some embodiments, the method illustrated in FIG. 5 may further comprise forwarding the calculated path P from the interface 315 to the UAV 100.

The UAV may, in any embodiment described herein, be capable of, or configured to, preparing for communication based on a second subscription in the second mobile communication network N11, N2, N3 while communication is effected based on a first subscription in the first mobile communication network N1, N11, N2. The path P may in these cases further define, in each portion P1, P2 of the restriction volume $VR_1$, $VR_2(t0)$, $VR_2(t1)$ and $VR_2(tn)$ where service coverage is provided by two or more mobile communication networks N1 and N11; N1 and N2; N11 and N2; N2 and N3, at least one alternative subscription that the UAV 100 shall prepare upon request or keep prepared/maintain in a prepared state. The at least one alternative subscription is configured to provide communication in at least one alternative mobile communication network different from a mobile communication network to which the UAV is presently connected. The alternative mobile communication network also provides service coverage in that portion P1, P2 of the restriction volume $VR_1$, $VR_2(t0)$, $VR_2(t1)$ and $VR_2(tn)$, i.e. in each portion P1 and P2 of the restriction volume $VR_1$, $VR_2(t0)$, $VR_2(t1)$ and $VR_2(tn)$ where service coverage is provided by two or more mobile communication networks. In FIGS. 1 and 2, N1 and N2; N11 and N2; and N2 and N3 represents such examples in the shaded portions P1 and P2 respectively. Thus, when flying along the path P in the first mobile communication network N1 and approaching or entering the second mobile communication network N2, the UAV 100 will begin to check if a first switching criterion SW1-2 is fulfilled when entering the portion P1. Later on, when flying along the path P in the second mobile communication network N2 and approaching or entering the third mobile communication network N3, the UAV 100 will begin to check if a second switching criterion SW2-3 is fulfilled when entering the portion P2, and so on. Another switching criterion relating to whether the UAV 100 shall be connected to the first mobile communication network N1 or an alternative mobile communication network N11 providing service coverage in the same area may be checked along the entire portion of the path P that lies in the coverage area for mobile communication networks N1 and N11. Preferably, the UAV 100 contains two or more instances of soft- or embedded SIMs. Namely, thereby, the UAV 100 is capable of maintaining connections to two or more mobile communication networks simultaneously. Naturally, this reduces the risk that the connection between the second network node 410 and the UAV 100 is broken unintentionally.

In general, during flight, the UAV 100 repeatedly monitors the quality of the connection that it has to its current mobile communication network, i.e. at its current location. Feedback data FB based on this monitoring is sent to the second network node 410. Thus, a coverage information database can be gradually enhanced, allowing for improved path planning in the future.

Prior to performing a switching operation, the UAV 100 is provisioned with the required information (e.g. MNO profile, frequency bands used by the MNO in the area) regarding the target network. This may be effected as follows:

In connection with receiving the path from the first network node 310, the UAV 100 obtains the required information. Then, during the flight, UAV 100 is responsible for the configuration of its modem at suitable point in time and space considering the path P and the portions P1 and P2, where service coverage is provided by two or more mobile communication networks. Alternatively, the first network node 310 may utilize provisioning tools present in the mobile communication network to which the UAV 100 is currently connected to directly provision the modem in the, without instructing the UAV 100 in advance.

Using soft or embedded SIM, the solution enables the UAV 100 to obtain a list of mobile communication networks and/or MNOs and their characteristics (including frequency bands used by the MNO in the area) during the flight route, and then to also prepare its on-board MNO profiles in the soft or embedded SIM so that the appropriate MNO profile is enabled before the UAV enters the area of that mobile communication network.

Preferably, the UAV 100 includes a software component that is configured to handle connection management in order to improve the resilience of the switch operation. As mentioned above, it is advantageous if the UAV 100 contains two or more instances of soft- or embedded SIMs.

The UAV 100 may emit a first notification (cf. the report message R) when the UAV 100 initiates the switching process, and a second notification (cf. the report message R) when the process has been completed. This allows efficient tracking of the UAV state by the flight controller.

If, for any reason the UAV 100, is unable to connect to the target network (for instance that network is experiencing technical issues) the UAV 100 is preferably configured to automatically fall back to the previously used network. In connection with doing so, UAV 100 is preferably configured to emit a notification to the flight Controller (cf. the report message R). If the fallback fails, the UAV 100 is preferably configured to keep trying to connect, alternatively try to an alternative network.

For the duration of the flight the solution is also monitoring the progress of the different network switch operations and can emit alerts if something does not unfold as expected.

A safe landing spot/safe landing location in the context of this disclosure Depending on the environment surrounding the path P, for example whether it resides on the countryside, in a rural or urban area, over the sea, considering the proximity of others UAVs, the local, national or regional regulations, and other factors, the UAV might not be allowed to be in the air during the network switch. Therefore, Step 530 of calculating a path P to be followed by the UAV 100 may comprise determining one or more safe landing spots/safe landing locations along, or in the immediate proximity of, the restriction volume $VR_1$, $VR_2(t0)$, $VR_2(t1)$ and $VR_2(tn)$, where the UAV 100 is allowed to land. The one or more safe landing spots may be located in areas where the UAV is passing from the service coverage of a first mobile communication network (for example N1) into the service coverage of a second mobile communication network (for example N2), and needs to perform a switch operation before leaving the coverage of the first mobile communication network in order to maintain its connectivity with the first network node 310 and/or a second network node 410. Such a safe landing spot may be used for landing during the network switch operation, if this is for some reason required. In more lenient conditions, it might be sufficient to reduce the speed of the UAV or to make it stationary during the network switch operation.

Figure 3:
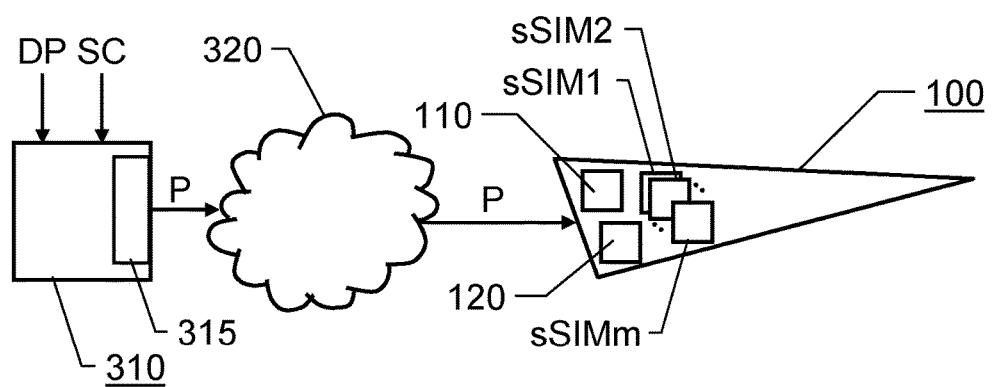
FIG. 3 shows a block diagram illustrating how a first network node is connected to a UAV during programming of the UAV according to one embodiment of the invention.

In some cases, it might be desirable to maintain minimal communication between the UAV 100 and the first network node 310 and/or a second network node 410 during the network switch operation. This can be achieved by for example utilizing a backup communication network, such as a Wi-Fi network in an urban area. In one or more embodiments, the UAV 100, as well as the first network node 310 and the second network node 410, may be configured to communicate using a backup communication network. In some embodiments, the path P may comprise instructions to the UAV 100 to reside (hoover, fly slowly, land etc.) in a coverage area of the backup communication network during the network switch operation. In some embodiments the first network node 310 or the second network node 410 may be configured to send, via their respective communication interface 315, 415, a control command to the UAV 100 instructing the UAV 100 to reside (hoover, fly slowly, land etc.) in a coverage area of the backup communication network during the network switch operation. The UAV 100 may correspondingly be configured to receive said control command via its communication interface 110. Referring to FIG. 3, to implement this method, a network node 310 that is configured to program a UAV 100 to be controlled based on communication via at least two mobile communication networks N1, N11, N2 and N3 respectively may comprise a first interface 315 and processing circuitry, the processing circuitry being configured to: receive position data DP describing a starting point S and a destination point D; set up a flight plan from the starting point S to the destination point D by obtaining information about service coverage SC provided by at least two mobile communication networks N1, N11, N2 and/or N3 in a volume between the starting and destination points S and D, and calculating a path P to be followed by the UAV 100 at least based on said obtained information. The processing circuitry is further configured to provide the path P via the first interface 315 of the network node 310, which path P defines a restriction volume $VR_1$, $VR_2(t0)$, $VR_2(t1)$, $VR_2(tn)$ within which the UAV 100 is allowed to fly from the starting point S to the destination point D. Preferably, the processing circuitry is further configured to, if at least first and second mobile communication networks N1, N11, N2 and N3 provide service coverage in the volume between the starting and destination points S and D, calculate the path P on the further basis of at least one switching criterion SW1-11, SW1-2 and SW2-3, as illustrated by in FIGS. 1 and 2, for changing from a communicative connection between the UAV 100 and the first mobile communication network, for example N1, N11 or N2, to a communicative connection between the UAV 100 and the second mobile communication network for example N11, N2 or N3.

In different embodiments, the path P may define a restriction volume $VR_1$ extending in the form of an unbroken tunnel from the starting point S to the destination point D, as illustrated in FIG. 1, or as a set of limited spaces, for example in the form of ellipsoids $VR_2(t0)$, $VR_2(t1)$, . . . , $VR_2(tn)$ within in which the UAV 100 is allowed to fly during different time periods t0, t1, to from the starting point S to the destination point D, as illustrated in FIG. 2.

In one or more embodiments, the UAV 100 may be capable of implementing one or more soft- or embedded SIM MNO profiles, sSIM1, sSIM2, sSIMm, which may be in the form of one or more embedded universal integrated circuit card (eUICC). Each of the one or more mobile network operator (MNO) profiles may be configured to store an operator profile, possibly including on-demand. In some embodiments, the UAV may also be configured to have connections to be connected to more than one mobile communication network and/or implementing more than one MNO simultaneously. These connections may be bundled together "over-the-top" using multipath solutions, such as for example MP-TCP (Multi-Path Transmission Control Protocol, as defined in IETF: RFC 6897 "Multipath TCP (MPTCP) Application Interface Considerations"), and/or Quick UDP Internet Connections (QUIC). The processing circuitry of the first network node 310 may correspondingly be configured to calculate the path P on the further basis of a presupposition that the UAV 100 is capable of implementing two or more MNO profiles, sSIM1, sSIM2, sSIMm, and the restriction volume $VR_1$, $VR_2(t0)$, $VR_2(t1)$ and $VR_2(tn)$ may be associated with a respective mobile communication network to which the UAV 100 shall be connected depending on the at least one switching criterion SW1-11, SW1-2 and SW2-3 while flying along the path P.

The usage of a soft or embedded SIM makes it possible to execute a switch between different mobile communication network belonging to different MNO operators, without having to install a physical SIM card in the UAV for each MNO to possibly be used during the flight. According to embodiments herein, the UAV is enabled to obtain information on which MNOs that provide mobile communication networks located in the area where the flight path is being determined, and also which bands/frequencies are available along the flight. Based on the obtained information, a data processor integrated in, connected to, or communicatively coupled to the UAV may be configured to pre-program the soft or embedded SIMs to be prepared to connect to the MNOs that are possible communication network providers along the defined flight path.

In one or more embodiments, the UAV is configured to check if the at least one switching criterion SW1-11, SW1-2 and SW2-3 is fulfilled via evaluation of at least one of: a signal power level, a signal quality level, a throughput measure, and a latency value. The at least one switching criterion SW1-11, SW1-2 and SW2-3 is preferably forwarded to the UAV 100 along with the path P from the first network node 310.

According to embodiments wherein the processing circuitry of the first network node 310 is configured to calculate the path P on the further basis of a presupposition that the UAV 100 is capable of implementing two or more soft or embedded SIM MNO profiles, sSIM1, sSIM2, sSIMm, and the restriction volume $VR_1$, $VR_2(t0)$, $VR_2(t1)$, $VR_2(tn)$ may be associated with a respective mobile communication network to which the UAV 100 shall be connected depending on the at least one switching criterion SW1-11, SW1-2, SW2-3 while flying along the path P; and/or the processing circuitry of the UAV 100 may in one or more embodiments be configured to check if the at least one switching criterion SW1-11, SW1-2, SW2-3 is fulfilled via evaluation of at least one of: a signal power level, a signal quality level, a throughput measure, and a latency value, the UAV may be configured to prepare for communication based on a second subscription in the second mobile communication network N11, N2, N3 while communication is effected based on a first subscription in the first mobile communication network N1, N11, N2. The path P may in these embodiments further define: in each portion P0, P1, P2 of the restriction volume $VR_1$, $VR_2(t0)$, $VR_2(t1)$ and $VR_2(tn)$ where service coverage is provided by two or more mobile communication networks N1 and N11; N1 and N2; N11 and N2; N2 and N3, at least one alternative subscription that the UAV 100 shall keep prepared/maintain in a prepared state, which at least one alternative subscription is configured to provide communication in at least one alternative mobile communication network different from a mobile communication network to which the UAV is presently connected, and which alternative mobile communication network also provides service coverage in that portion P0, P1 and P2 of the restriction volume $VR_1$, $VR_2(t0)$, $VR_2(t1)$ and $VR_2(tn)$ respectively. In one or more of these embodiments, the processing circuitry may further be configured to cause the first interface 315 to forward the path P to the UAV 100 over at least one network 320.

In one or more embodiments, there is provided a computer program comprising computer code which, when run on a processing circuitry of a first network node 310, causes the first network node 310 to be configured to: receive position data DP describing starting and destination points S; D respectively; set up a flight plan from the starting point S to the destination point D, the setting up of the flight plan comprising: obtaining information about a service coverage SC provided by at least two mobile communication networks N1, N11, N2 and N3 in a volume between the starting and destination points S and D respectively; calculating a path P to be followed by the UAV 100 at least based on said obtained information; and provide the path P via a first interface 315 of the first network node 310, which path P defines a restriction volume $VR_1$, $VR_2(t0)$, $VR_2(t1)$ and $VR_2(tn)$ within in which the UAV 100 is allowed to fly from the starting point S to the destination point D. If at least first and second mobile communication networks N1, N11, N2 and N3 provide service coverage in said volume, the computer code which, when run on a processing circuitry of a first network node 310, causes the first network node 310 to be further configured to: calculate the path P on the further basis of at least one switching criterion SW1-11, SW1-2 and SW2-3 for changing from a communicative connection between the UAV 100 and the first mobile communication network N1, N11 and N2 to a communicative connection between the UAV 100 and the second mobile communication network N11, N2 and N3. In some embodiments, there is provided a computer program product comprising a computer-readable storage medium storing the above described computer program.

Figures 6A, 6B:
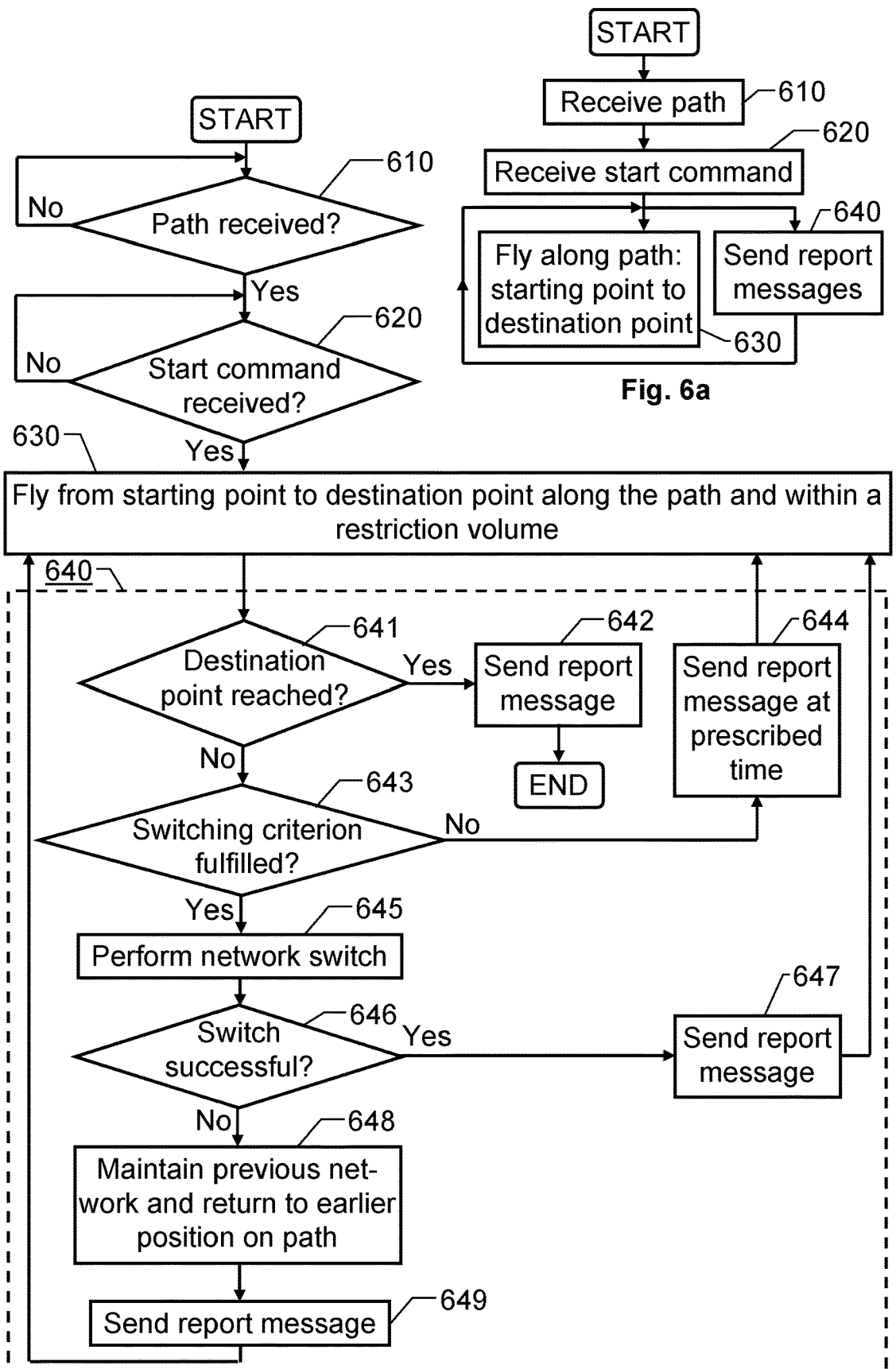
FIGS. 6a-b are flow charts illustrating the general method according to the invention employed when flying the UAV and according to one embodiment of the invention respectively.

Referring now to FIG. 6a, we will describe embodiments of a method implemented and/or performed in a UAV 100, for controlling the UAV based on communication via at least two mobile communication networks N1, N11, N2 and N3, and which UAV 100 is configured to be programmed by receiving a path P to be followed by the UAV 100 from a starting point S to a destination point D, wherein the path P has been calculated according to any one of the method embodiments described in connection with FIG. 5.

Step 610: receiving a path P to be followed by the UAV 100 from a starting point S to a destination point D.

Step 620: receiving a start command Scmd.

Step 630: in response to the received start command Scmd, flying the UAV 100 from the starting point S to the destination point D along the path P.

Step 640: while flying along the path P, sending, repeatedly, report messages R to a second network node 410, which report messages R indicate a connection status between the UAV 100 and the at least two mobile communication networks N1, N11, N2 and N3.

Turning now to FIG. 6b, we will describe some optional embodiments of the method described in connection with FIG. 6a.

As illustrated in FIG. 6b, Step 610 of receiving a path P to be followed by the UAV 100 from a starting point S to a destination point D may comprise checking whether a path P has been received and, if a path P has been received, continue with Step 620, or, otherwise, repeat Step 610.

Step 620 of receiving a start command Scmd may similarly comprise checking whether a start command Scmd has been received and, if a start command Scmd has been received, continue with Step 630, or, otherwise, repeat Step 620. Step 630 flying the UAV 100 from the starting point S to the destination point D along the path P of in response to the received start command Scmd may further comprise flying the UAV 100 from the starting point S to the destination point D along the path P within a restriction volume $VR_1$, $VR_2(t0)$, $VR_2(t1)$ and $VR_2(tn)$, also in response to the received start command Scmd. In other words the received start command Scmd may comprise information on a path P having a starting point S and a destination point D, and may further in some embodiments comprise information on a restriction volume $VR_1$, $VR_2(t0)$, $VR_2(t1)$ and $VR_2(tn)$ in which the UAV 100 is allowed to fly along the path P.

Step 640 of repeatedly sending report messages R to a second network node 410, which report messages R indicate a connection status between the UAV 100 and one of the at least two mobile communication networks N1, N11, N2 and N3, while flying along the path P, may comprise one or more of the Steps 641-649 described below, wherein the report messages R may comprise any or all of the report messages sent in Steps 644, 647 and/or 648. In addition to the report messages sent in Steps 644, 647 and/or 649, a report message indicating reaching the destination point D is advantageously also sent in Step 642, if the requirements for sending this message are fulfilled, i.e. if the destination point D has been reached.

Step 641: checking whether the Destination point D has been reached and, if the Destination point D has been reached, continue to Step 642, or, if the Destination point D has not been reached, continue to Step 643.

Step 642: sending a report message to the second network node 410 that the Destination point D has been reached, and thereafter ending the method.

Step 643: assessing whether a trigger condition has been fulfilled by checking whether at least one switching criterion SW1-11, SW1-2 and SW2-3 has been fulfilled and, if at least one switching criterion SW1-11, SW1-2, SW2-3 has been fulfilled, continue to Step 645, or, otherwise, continue to Step 644. Step 644: sending a report message to the second network node 410, at a prescribed time, the report message comprising information indicating that none of the switching criteria SW1-11, SW1-2 and SW2-3 has been fulfilled. Thereafter, the method continues with Steps 630 and 640 of flying the UAV 100 from the starting point S to the destination point D along the path P and, while flying along the path P, repeatedly sending report messages R to the second network node 410.

Step 645: perform a network switch, from a first mobile communication network to a second mobile communication network, and thereafter continue to Step 646.

Step 646: assessing whether a trigger condition has been fulfilled by checking whether the network switch of Step 645 has been successful and, if it was successful, continue to Step 647, or, otherwise, continue to Step 648.

Step 647: sending a report message to the second network node 410, the report message comprising information indicating that a network switch has been successfully performed. Thereafter, the method continues with Steps 630 and 640 of flying the UAV 100 from the starting point S to the destination point D along the path P and, while flying along the path P, repeatedly sending report messages R to the second network node 410.

Step 648: maintaining a connection with the previous mobile communication network, for example the first mobile communication network N1 if no switch has been performed yet, and return the UAV to an earlier position on the path P, and thereafter continue to Step 649. The earlier position may advantageously be a predefined position where it is safe for the UAV 100 to be located, either in the air or on the ground.

Step 649: sending a report message to the second network node 410, the report message comprising information indicating that a network switch has not been performed. Thereafter, the method continues with Steps 630 and 640 of flying the UAV 100 from the starting point S to the destination point D along the path P and, while flying along the path P, repeatedly sending report messages R to the second network node 410.

The method described in connection with FIGS. 6a and/or 6b may further comprise receiving a control command Ccmd from the second network node 410 and, in response to the control command Ccmd, flying the UAV 100 along a path different from the originally calculated path P.

In any embodiments presented herein, the first network node 310 may be co-located with the second network node 410, for example by being implemented in the same unit or node.

According to one or more embodiment for flying the UAV 100 along a path different to the path P, as described herein, this may refer to the path P being updated in response to a control command Ccmd sent from the second network node 410, such that the path P to be followed by the UAV in Step 630, for example, is set to the updated path P.

Figure 4:
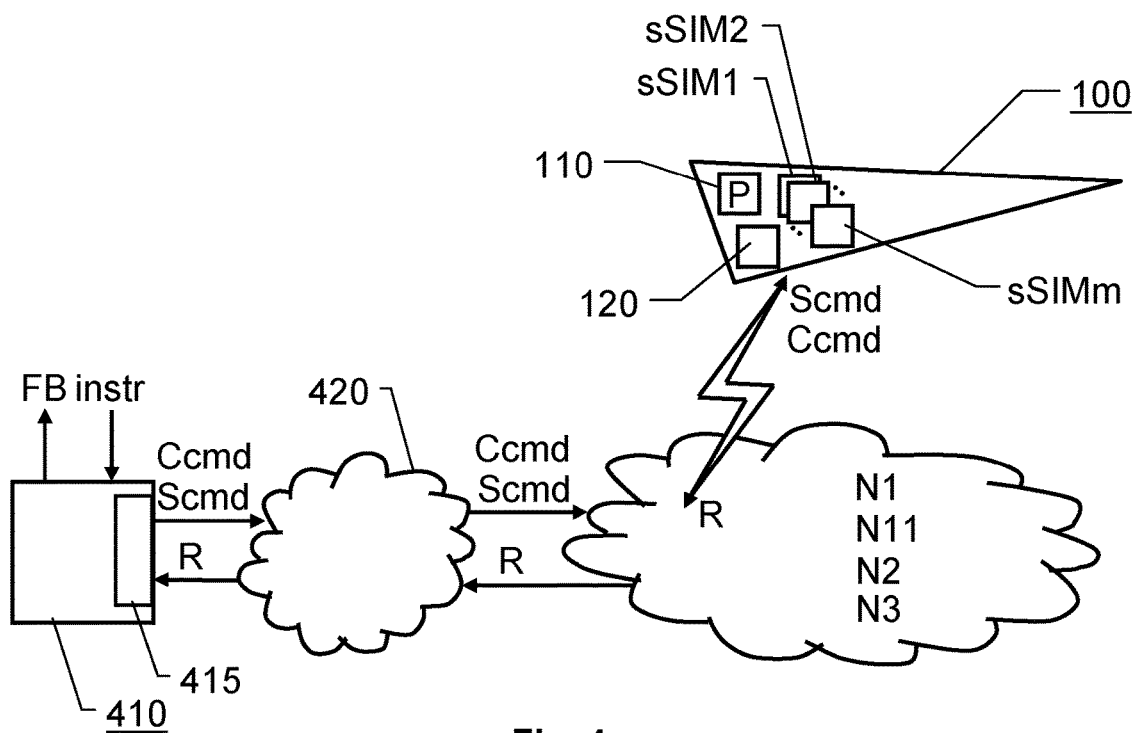
FIG. 4 shows a block diagram illustrating how a second network node is connected to a UAV while flying the UAV according to one embodiment of the invention.

Referring to FIGS. 3 and 4, to implement the method embodiments presented in connection with FIGS. 6a and 6b, a UAV 100 may comprise a communication interface 110 and processing circuitry 120, the processing circuitry 120 being configured to: enable the UAV 100 to be controlled based on communication via at least two mobile communication networks N1, N11, N2 and N3; be programmed according to the any of the method embodiments described in connection with FIG. 5; and receive a path P to be followed by the UAV 100 from a starting point S to a destination point D. The processing circuitry 120 may further be configured to receive a start command Scmd; in response to receiving the start command Scmd fly the UAV 100 from the starting point S to the destination point D along the path P; and, while flying along the path P, repeatedly send report messages R to a second network node 410, which report messages R indicate a connection status between the UAV 100 and one of the at least two mobile communication networks N1, N11, N2 and N3. In one or more embodiments, in addition to the report messages R, the processing circuitry 120 may further be configured to send a report message indicating reaching the destination point D to the second network node 410, if the requirements for sending this message are fulfilled, i.e. if the destination point D has been reached.

In some embodiments, the processing circuitry 120 may further be configured to render the UAV adapted to receive a control command Ccmd from said second network node 410 and, in response to the control command Ccmd, fly the UAV 100 along a path different from the path P. In one or more embodiments, the path P to be followed by the UAV 100 from a starting point S to a destination point D, the start command Scmd and/or the control command Ccmd may be received via the communication interface 110, and/or the report messages may be sent via the communication interface 110.

In one or more embodiments, there is provided a computer program comprising computer code which, when run on a processing circuitry of a UAV 100, causes the UAV 100 to be configured to: be controlled based on communication via at least two mobile communication networks N1, N11, N2 and N3, be programmed by receiving a path P to be followed by the UAV 100 from a starting point S to a destination point D, wherein the path P has been calculated according to any of the method embodiments described in connection with FIG. 5 and, thereafter: receive a start command Scmd; in response thereto fly the UAV 100 from the starting point S to the destination point D along the path P; and, while flying along the path P, send, repeatedly, report messages R to a second network node 410, which report messages R indicate a connection status between the UAV 100 and one of the at least two mobile communication networks N1, N11, N2 and N3. The computer program may further comprise computer code which, when run on the processing circuitry of the UAV 100, causes the UAV 100 to be configured to receive a control command Ccmd from the second network node 410; and, in response to the control command Ccmd, fly the UAV 100 along a path different from the path P. In one or more embodiments, there is provided a computer program product comprising a computer-readable storage medium storing the computer program according to any of these embodiments.

Figure 7:
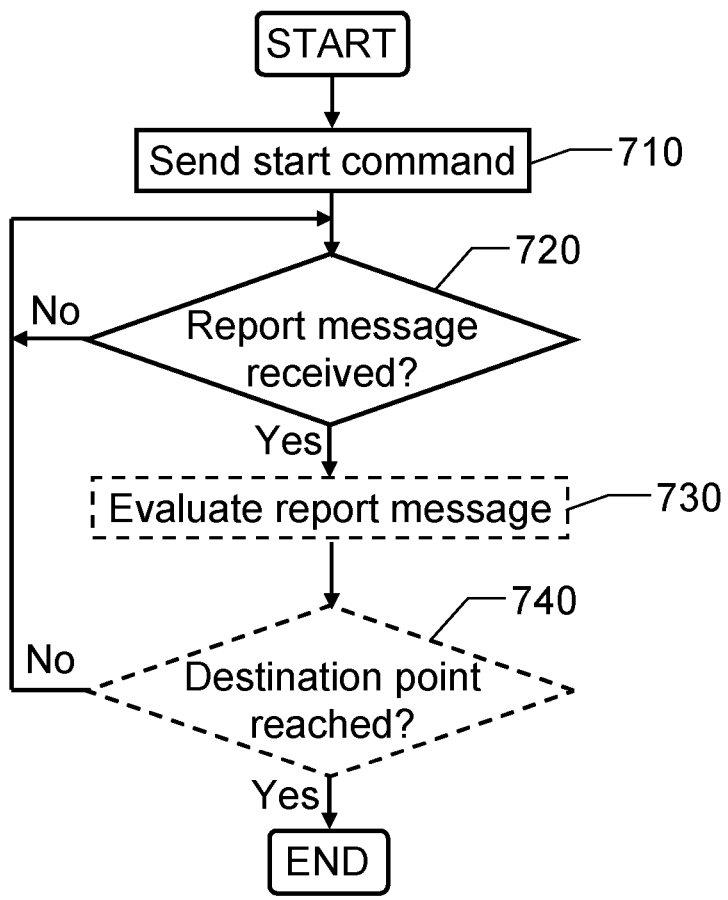
FIG. 7 is a generalized block diagram illustrating the method implemented in the second network node while controlling the UAV in flight.

Turning to FIG. 7, we will describe embodiments of a method implemented and/or performed in a second network node 410 for controlling a UAV 100, based on communication via at least two mobile communication networks N1, N11, N2 and N3, and which UAV 100 has been programmed according to any one of the method embodiments described in connection with FIG. 5.

Step 710: sending a start command Scmd to the UAV 100, which start command Scmd is configured to cause the UAV 100 to initiate a flight from the starting point S to the destination point D along said path P.

Step 720: after having sent the start command, receiving, repeatedly, report messages R from the UAV 100, which report messages R indicate a connection status between the UAV 100 and one of the at least two mobile communication networks N1, N11, N2 and N3.

The method in the second network node 410 may further comprise one, or both, of the optional steps 730 and 740.

Step 730 (optional): evaluating the report messages R; and if a trigger condition is fulfilled sending a control command Ccmd to the UAV 100, which control command Ccmd is configured to cause the UAV 100 to fly along a path different from the path P.

Step 740 (optional): generating feedback information FB based on the report messages R, which feedback information FB reflects the connection status between the UAV 100 and one of the at least two mobile communication networks N1, N11, N2 and N3.

According to embodiments wherein step 730 and/or step 740 have been performed, the method in the second network node 410 may further comprise receiving at least one instruction relating to an adjustment of the path P and, in response thereto, sending the control command Ccmd to the UAV 100.

Referring to FIG. 4, to implement the method embodiments presented in connection with FIG. 7, a second network node 410 may be configured to control a UAV 100 based on communication via at least two mobile communication networks N1, N11, N2 and N3, and possibly also via an intermediate network 420, and which UAV 100 has been programmed according to the any of the method embodiments described in connection with FIG. 5. The second network node 410 may comprise a second interface 415 and processing circuitry, the processing circuitry being configured to: send a start command Scmd to the UAV 100 via the second interface 415, which start command Scmd is configured to cause the UAV 100 to fly from the starting point S to the destination point D along said path P. After having sent the start command, the processing circuitry may be configured to receive, repeatedly, report messages R from the UAV 100 via the second interface 415, which report messages R indicate a connection status between the UAV 100 and one of the at least two mobile communication networks N1, N11, N2 and N3. In one or more embodiments, in addition to the report messages R, the processing circuitry 120 may advantageously further be configured to receive a report message indicating that the UAV has reached the destination point D.

In one or more embodiments, the processing circuitry may further be configured to evaluate the report messages R and, if a trigger condition is fulfilled, send a control command Ccmd to the UAV 100 via the second interface 415, which control command Ccmd is configured to cause the UAV 100 to fly along a path different from the path P.

In some embodiments, the processing circuitry may further be configured to generate feedback information FB based on the report messages R, which feedback information FB reflects the connection status between the UAV 100 and one of the at least two mobile communication networks N1, N11, N2 and N3.

According to embodiments wherein the processing circuitry is configured to evaluate the report messages R and, if a trigger condition is fulfilled, send a control command Ccmd to the UAV 100 via the second interface 415, which control command Ccmd is configured to cause the UAV 100 to fly along a path different from the path P; and/or to generate feedback information FB based on the report messages R, which feedback information FB reflects the connection status between the UAV 100 and one of the at least two mobile communication networks N1, N11, N2 and N3, the processing circuitry may further be configured to receive at least one instruction relating to an adjustment of the path P and in response thereto send the control command Ccmd to the UAV 100 via the second interface 415.

In one or more embodiments, there is provided a computer program comprising computer code which, when run on a processing circuitry of a second network node 410 for controlling a UAV 100, based on communication via at least two mobile communication networks N1, N11, N2 and N3, which UAV 100 has been programmed according to the method embodiments presented in connection with FIG. 5, causes the second network node 410 to be configured to: send a start command Scmd to the UAV 100, which start command Scmd is configured to cause the UAV 100 to initiate a flight from the starting point S to the destination point D along said path P, and after having sent the start command receive, repeatedly, report messages R from the UAV 100, which report messages R indicate a connection status between the UAV 100 and one of the at least two mobile communication network N1, N11, N2 and N3. The computer program may further comprise computer code which, when run on the processing circuitry of the second network node 410 causes the second network node 410 to evaluate the report messages R and, if a trigger condition is fulfilled, send a control command Ccmd to the UAV 100, which control command Ccmd is configured to cause the UAV (100) to fly along a path different from the path P. The computer program according to any of these embodiments may further comprise computer code which, when run on the processing circuitry of the second network node 410 causes the second network node 410 to generate feedback information FB based on the report messages R, which feedback in-formation FB reflects the connection status between the UAV 100 and one of the at least two mobile communication networks N1, N11, N2 and N3.

In embodiments wherein the computer program comprises computer code which causes the second network node 410 to evaluate the report messages R and, if a trigger condition is fulfilled, send a control command Ccmd to the UAV 100, which control command Ccmd is configured to cause the UAV 100 to fly along a path different from the path P; and/or wherein the computer program comprises computer code causes the second network node 410 to generate feedback information FB based on the report messages R, which feedback in-formation FB reflects the connection status between the UAV 100 and one of the at least two mobile communication networks N1, N11, N2 and N3, the computer program may further comprise computer code which, when run on the processing circuitry of the second network node 410 causes the second network node 410 to: receive at least one instruction relating to an adjustment of the path P; and in response thereto send the control command Ccmd to the UAV 100. In one or more embodiments, there is provided a computer program product comprising a computer-readable storage medium storing the computer program according to any of these embodiments.

The invention claimed is:

1. A method for controlling a path of an unmanned aerial vehicle (UAV) across at least two mobile communication networks having different mobile network operators (MNOs), wherein the UAV is capable of operating with the different MNOs, the method comprising:

receiving position data describing a starting point and a destination point for the UAV;

setting a flight plan for the UAV from the starting point to the destination point that traverses a first mobile communication network operated by a first mobile network operator (MNO) and a second mobile communication network operated by a second MNO, wherein the second MNO is different from the first MNO, comprising:

obtaining information about service coverage provided by the first mobile communication network and service coverage provided by the second mobile communication network in a volume of space between the starting point and the destination point, wherein the first mobile communication network and the second mobile communication network have a portion of each's respective coverage area intersect to form a common intersecting coverage area;

calculating a path to be followed by the UAV at least based on the obtained information, wherein the path defines a restriction volume within which the UAV is allowed to fly traversing the first mobile communication network and the second mobile communication network, and traversing the common intersecting coverage area; and calculating the path on a further basis of at least one switching criterion for changing from a first communicative connection between the UAV and the first mobile communication network to a second communicative connection between the UAV and the second mobile communication network while traversing the common intersecting coverage area; and directing the UAV based on the flight plan to follow the path to fly in the restriction volume traversing the first mobile communication network under control of the first MNO, switching from the first MNO to the second MNO while traversing the common intersecting coverage area, and traversing the second mobile communication network under control of the second MNO.

2. The method according to claim 1, wherein calculating the path is further based on the UAV capable of implementing two or more soft or embedded subscriber identification module of MNO profiles associated with the first MNO and the second MNO.

3. The method according to claim 1, wherein the at least one switching criterion comprises evaluation of at least one or more of:

a signal power level, a signal quality level, a throughput measure, and a latency value.

4. The method according to claim 1 further comprising forwarding the path to the UAV via the first mobile communication network.

5. The method according to claim 1, wherein the restriction volume represents a tunnel extending from the starting point to the destination point.

6. The method according to claim 1, wherein the restriction volume represents a limited space and wherein a location of the restriction volume between the starting point and the destination point varies over time.

7. A method for controlling a path of an unmanned aerial vehicle (UAV) across at least two mobile communication networks having different mobile network operators (MNOs), wherein the UAV is capable of operating with the different MNOs, the method comprising:

receiving path information to be followed by the UAV from a starting point to a destination point, wherein the path information is derived at a network node and communicated to the UAV, in which the path information provides for:
  setting a flight plan for the UAV from the starting point to the destination point that traverses a first mobile communication network operated by a first mobile network operator (MNO) and a second mobile communication network operated by a second MNO, wherein the second MNO is different from the first MNO, by:
    obtaining information about service coverage provided by the first mobile communication network and service coverage provided by the second mobile communication network in a volume of space between the starting point and the destination, wherein the first mobile communication network and the second mobile communication network have a portion of each's respective coverage area intersect to form a common intersecting coverage area;
    calculating a path to be followed by the UAV at least based on the obtained information, wherein the path defines a restriction volume within which the UAV is allowed to fly traversing the first mobile communication network and the second mobile communication network, and traversing the common intersecting coverage area; and
    calculating the path on a further basis of at least one switching criterion for changing from a first communicative connection between the UAV and the first mobile communication network to a second communicative connection between the UAV and the second mobile communication network while traversing the common intersecting coverage area; and
  flying the UAV from the starting point to the destination point along the path based on the flight plan to fly in the restriction volume and traversing the first mobile communication network under control of the first MNO, switching from the first MNO to the second MNO while traversing the common intersecting coverage area, and traversing the second mobile communication network under control of the second MNO.

8. The method according to claim 7, further comprising:
receiving a control command; and
in response to the control command, flying along a second path different from the path.

9. A network node for controlling a path of an unmanned aerial vehicle (UAV) across at least two mobile communication networks having different mobile network operators (MNOs), wherein the UAV is capable of operating with the different MNOs, the network node comprising:
an interface; and
a processing circuitry and computer program code, wherein the processing circuitry executes the computer program code to perform operations to cause the first network node to:
  receive position data describing a starting point and a destination point for the UAV;
  set a flight plan for the UAV from the starting point to the destination point that traverses a first mobile communication network operated by a first mobile network operator (MNO) and a second mobile communication network operated by a second MNO, wherein the second MNO is different from the first MNO, comprising:
    obtain information about service coverage provided by the first mobile communication network and service coverage provided by the second mobile communication network in a volume of space between the starting point and the destination point, wherein the first mobile communication network and the second mobile communication network have a portion of each's respective coverage area intersect to form a common intersecting coverage area;
    calculate a path to be followed by the UAV at least based on said obtained information, wherein the path defines a restriction volume within which the UAV is allowed to fly traversing the first mobile communication network and the second mobile communication network, and traversing the common intersecting coverage area; and
    calculate the path on a further basis of at least one switching criterion for changing from a first communicative connection between the UAV and the first mobile communication network to a second communicative connection between the UAV and the second mobile communication network while traversing the common intersecting coverage area; and
  direct the UAV based on the flight plan to follow the path to fly in the restriction volume traversing the first mobile communication network under control of the first MNO, switching from the first MNO to the second MNO while traversing the common intersecting coverage area, and traversing the second mobile communication network under control of the second MNO.

10. The network node according to claim 9, wherein the network node is further to:
calculate the path on a further basis that the UAV is capable of implementing two or more soft or embedded subscriber identification module of MNO profiles associated with the first MNO and the second MNO.

11. The first network node according to claim 9, wherein the processing circuitry further causes the interface of the network node to forward the path to the UAV via the first mobile communication network.

12. The first network node according to claim 9, wherein the restriction volume represents a tunnel extending from the starting point to the destination point.

13. The network node according to claim 9, wherein the restriction volume represents a limited space and wherein a location of the restriction volume between the starting point and the destination point varies over time.

14. An unmanned aerial vehicle (UAV) for flying across at least two mobile communication networks having different mobile network operators (MNOs), wherein the UAV is capable of operating with the different MNOs, the UAV comprising:
a communication interface; and
a processing circuitry and computer program code, wherein the processing circuitry executes the computer program code to enable the UAV to be controlled by performing operations to;
  receive path information to be followed by the UAV from a starting point to a destination point, wherein the path information is derived at a network node and communicated to the UAV, in which the path information provides for the UAV to:

set a flight plan for the UAV from the starting point to the destination point that traverses a first mobile communication network operated by a first mobile network operator (MNO) and a second mobile communication network operated by a second MNO, wherein the second MNO is different from the first MNO, by performing operations to:
  obtain information about service coverage provided by the first mobile communication network and service coverage provided by the second mobile communication network in a volume of space between the starting point and the destination point, wherein the first mobile communication network and the second mobile communication network have a portion of each's respective coverage area intersect to form a common intersecting coverage area;
  calculate a path to be followed by the UAV at least based on the obtained information, wherein the path defines a restriction volume within which the UAV is allowed to fly traversing the first mobile communication network and the second mobile communication network, and traversing the common intersecting coverage area; and
  calculate the path on a further basis of at least one switching criterion for changing from a first communicative connection between the UAV and the first mobile communication network to a second communicative connection between the UAV and the second mobile communication network while traversing the common intersecting coverage area; and fly the UAV from the starting point to the destination point along the path based on the flight plan to fly in the restriction volume and traversing the first mobile communication network under control of the first MNO, switching from the first MNO to the second MNO while traversing the common intersecting coverage area, and traversing the second mobile communication network under control of the second MNO.

15. The UAV according to claim 14, wherein the processing circuitry renders the UAV further to:
  receive a control command; and
  in response to the control command, fly the UAV along a second path different from the first path.

* * * * *